G. W. SWIFT, Jr.
MACHINE FOR FACING CORRUGATED PAPER.
APPLICATION FILED MAR. 13, 1911.
Reissued Jan. 5, 1915.
13,863.
2 SHEETS—SHEET 1.
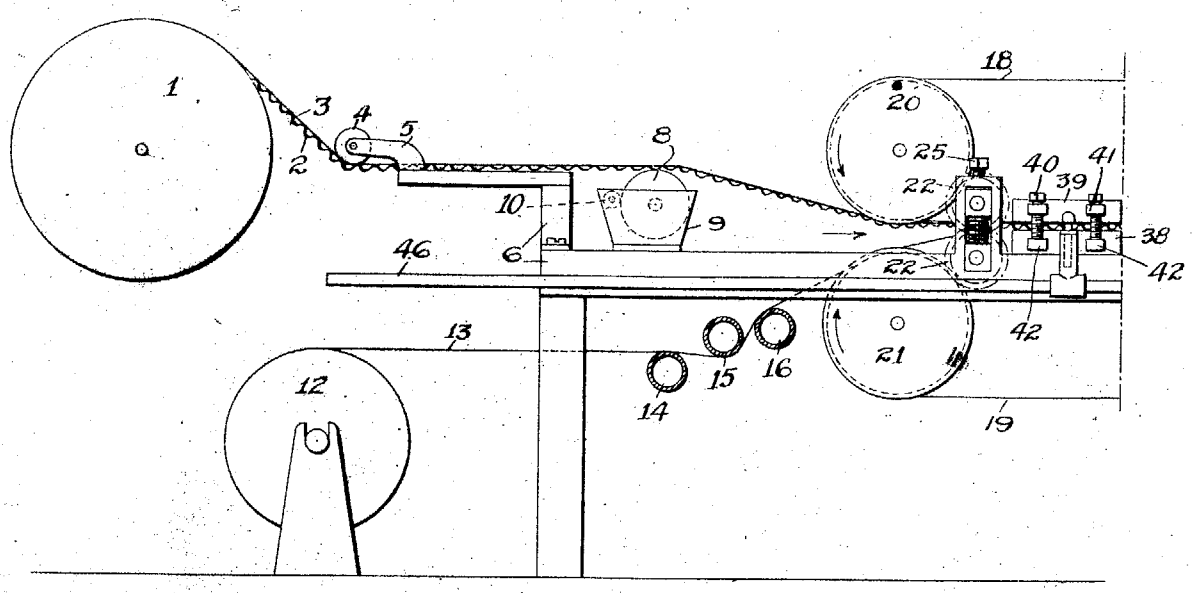
FIG. I.
WITNESSES
Geo. A. Senior
Irving Sellock
George W. Swift, Jr.,
INVENTOR
BY Theo. H. Bonnscott
ATTORNEY G. W. SWIFT, Jr.
MACHINE FOR FACING CORRUGATED PAPER.
APPLICATION FILED MAR. 13, 1911.
Reissued Jan. 5, 1915.
13,863.
2 SHEETS—SHEET 2.
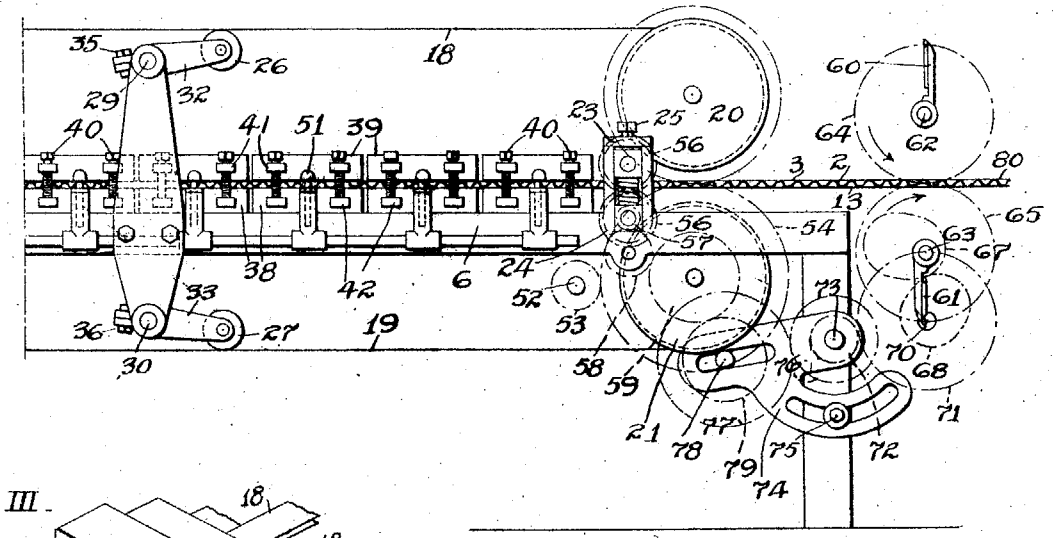
FIG. II.
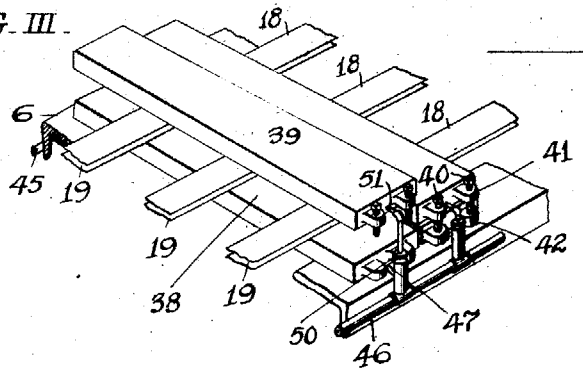
FIG. III.
WITNESSES
George W. Swift, Jr.
INVENTOR
BY
Thos. H. Dowrescue
ATTORNEY

UNITED STATES PATENT OFFICE.

GEORGE W. SWIFT, JR., OF BORDENTOWN, NEW JERSEY, ASSIGNOR, BY MESNE ASSIGNMENTS, TO CORRUGATED PAPER PATENTS CO., OF DAYTON, OHIO.

MACHINE FOR FACING CORRUGATED PAPER.

13,863. Specification of Reissued Letters Patent. Reissued Jan. 5, 1915.

Original No. 917,503, dated April 6, 1909, Serial No. 443,604. Application for reissue filed March 13, 1911. Serial No. 614,246.

*To all whom it may concern:*

Be it known that I, GEORGE W. SWIFT, Jr., of Bordentown, in the county of Burlington and State of New Jersey, have invented certain new and useful Improvements in Machines for Facing Corrugated Paper, of which the following is a specification.

This invention relates to a machine which being supplied with a web of corrugated paper having plane paper webs upon opposite sides thereof and adhesive material at the contiguous surfaces of said webs, advances said webs continuously through the machine under pressure which retains said plane webs in substantially uniform contact with said corrugated web throughout the entire area thereof, and contemporaneously dries the adhesive material, thus producing what is termed a plane faced cellular paper board which, on account of its exceedingly light weight and comparatively great stiffness and resiliency, provides a most desirable material for packing and shipping cases and dividing partitions therefor.

It will be apparent that the size and flexibility of the individual webs, prior to their being secured to each other, render it difficult to keep said webs in proper contact with each other throughout the entire area thereof while the liquid adhesive material is setting and hardening. Obviously, the superposed webs must be subjected to a uniform pressure to hold them in contact with each other, and this pressure necessarily creates friction which must be overcome in advancing the webs through the machine. Inasmuch as it is the practice to cut the product of the machine into sheets, as it passes from the machine, it will be apparent that the connected webs must be subjected to the additional pressure of moving members, such pressure generating sufficient friction to grip the webs and overcome the friction due to the pressure of the means employed for preliminarily keeping said webs in contact with each other. The problems presented in the construction of machines of this character comprise, first, that of facilitating the drying operation in order that the machine will not be of undue length, and, second, to subject the webs to advancing forces sufficient to overcome the friction of the heating and compressing surfaces and yet insufficient to crush the corrugations and thus destroy the desired qualities of the product.

The principal objects of the present invention are, first, to so combine the compressing and advancing mechanisms as to materially reduce friction and thus economize power and insure the application of advancing forces in such manner as to keep them well within the crushing or destructive limit; second, to provide improved means for facilitating the drying operation, and thus increase the speed at which the machine may be operated and, in connection with the combining of the advancing and compressing mechanisms, materially shorten the usual excessive length of machines of this character; third, to improve upon the means for adjusting the heating and compressing surfaces, to adapt the same to multiple webs of varying thicknesses; fourth, to provide improved mechanism for severing said multiple web into sheets, as it is discharged from the machine, without interruption of advancing movement, and, fifth, to otherwise simplify the construction and operation of machines of this character, and to increase the capacity and improve the product thereof.

My invention will be readily understood by reference to the accompanying drawings, forming a part of this specification, in which—

Figures I and II show complementary portions of a side elevation of a machine conveniently embodying my invention; said elevation being made in two views for convenience of illustration. Fig. III is a fragmentary perspective view showing one of the upper heaters raised from its normal position to afford access to the belts extending between the upper and lower heaters.

Referring now to the drawings, in detail, numeral 1 refers to a reel supporting a roll of corrugated paper web 2 which is wound with a plane paper web 3. Said two webs pass beneath the guide roller 4, conveniently supported in the brackets 5 extending from the machine frame 6. As shown in Fig. I, the corrugated paper web 2 passes in contact with the paste roll 8 which is mounted to rotate in the paste receptacle 9, which is provided with the doffer roll 10 and supported in a stationary position on said frame 6, and said corrugated web 2 is thus coated with adhesive on its lower surface.

The reel 12, shown in Fig. I, carries a roll of plane paper web 13, which passes between the steam pipes 14, 15 and 16, so as to remove the curl from it before being brought into contact with the adhesive coated surface of said corrugated web 2. The opposed flexible sheet metal belts 18 and 19, are respectively supported on the drums 20 and 21 and their proximal runs pass between the pair of guide rolls 22, and the pair of feed rolls 23 and 24 which are so mounted in bearings on said frame 6 that the space between them for the passage of the paper, may be adjustably varied by rotation of the screws 25. Said belts 18 and 19 are maintained at the proper tension by the respective tightening rollers 26 and 27 which are respectively adjustable upon the studs 29 and 30 carried in rigid relation with said frame 6; such adjustment being conveniently effected by means of the arms 32 and 33 which have split hubs which may be tightened or loosened with respect to said studs 29 and 30 by means of the bolts 35 and 36. The proximal runs of said belts 18 and 19 pass between the opposed heaters which are conveniently formed of separable metal boxes 38 and 39, the former being maintained in stationary position on said frame 6 and the boxes 39 being vertically adjustable to vary the space between them and the boxes 38 by means of set screws 40 which extend through corresponding screw threaded sockets in the lugs 41, and bear upon the upper surfaces of the lugs 42.

Steam is supplied to and condensate withdrawn from said heaters 38 and 39 by means of the pipes 45 and 46, shown in Fig. III, extending upon respectively opposite sides of the frame 6 and conveniently supported in rigid relation with the latter. Said pipes have permanent branch connections 47 with the boxes 38, and have stuffing boxes 50 through which the branch connections 51 leading to the boxes 39 may be reciprocated without disconnection, so as to not only permit of such variation in the space between the upper and lower heaters as is necessitated by the differing thicknesses of the cellular board product of the machine, but also to permit the upper heaters 39 to be raised to an abnormal extent as shown in Fig. III so as to afford access to the space between the upper and lower heaters and the metallic belts extending between them and thus permit the ready removal of any obstruction from said space.

It may be observed that by the arrangement above described, the opposed runs of the metallic belts 18 and 19, by and between which the paper webs are carried, may be heated to any desired degree independently of the other portions of the belts, and thus serve to distribute the heat rapidly and uniformly to said webs while maintaining the latter in predetermined assembled relation during their passage between the heaters 38 and 39, and that the space between said belt-runs, determining the thickness of the plane-face cellular paper board product of the machine, may be adjustably varied by changing the relative position of the feed rolls 23 and 24, independently of the drums 20 and 21, which support and drive said belts.

In order to positively progress at constant speed said belts 18 and 19 and the cellular board formed between them, the main driving shaft 52, shown in Fig. II, is provided with the driving gear 53 in mesh with the gear 54 on the drum 21, said gear 54 is meshed with the gear 55 on the drum 20, said feed rolls 23 and 24 are connected by the gears 56, and said roll 24 has the gear 57 meshed with the gear 58 driven by the gear 59 carried by said drum 21. Said gears 56 have long teeth to permit variation of the space between them as above described.

As shown in Fig. II, the shearing mechanism comprises the opposite rotary knives 60 and 61, respectively, carried by the shafts 62 and 63 and connected by the gears 64 and 65. Said shearing mechanism is operatively connected in variable relation with said driving shaft 52 and its gears 53 by the train of gearing comprising the elliptical gears 67 and 68, the former being on the shaft 63 of the knife 61 and the latter being on the shaft 70, and both being adjustable circumferentially on their shafts and having means to secure them in adjusted position. Said shaft 70 carries the gear 71 meshed with the gear 72 on the shaft 73 and the axis of the latter is the center of oscillation of the adjustable frame 74 which may be manually shifted to change the gearing, but is retained in a normally stationary position by the bolt 75 which engages the frame of the machine. Said shaft 73 carries the gear 76 meshed with the gear 77 on the shaft 78 carried by said frame 74, and said shaft 78 is provided with the gear 79 meshed with the gear 59 on said drum 21. As above noted, said frame 74 and the gears carried thereby may be manually shifted to change the ratio of the gearing connecting the main driving shaft 52 with the shearing mechanism; for instance, said frame 74 may be turned on its center of oscillation co-incident with the shaft 73, to withdraw the gear 79 from engagement with the gear 59 and present the gear 77 in engagement with said gear 59, with the result that the shearing mechanism will be rotated slower than when the gears are connected as shown in Fig. II. As the speed of traverse of the webs forming the cellular board 80 is maintained constant as above described, the length of said board passed through the shearing mechanism during a single revolution of the latter will be greater, with the proposed change of gearing, and consequently the sheets cut from said board 80 will be longer than the sheets cut with the gearing connected as shown in Fig. II.

It may be observed that equal circular gears might be substituted for the elliptical gears above described if the shearing mechanism were always rotated at such speed that the length of the cellular board passed therethrough during a single revolution equaled the respective circumferences of the counterpart circles described by the complementary shearing radii of the knives 60 and 61; because, under such conditions, the speed of the knives at the instant of the shearing operation, as well as during the other part of their rotation, would equal the speed of traverse of said board and the latter would be cleanly cut. However, if while the speed of the webs is maintained constant, the shearing mechanism were caused to rotate faster, to cut sheets of less length than said described circumference, said knives would travel faster than said board at the instant of the shearing operation, and would tend to tear it, and on the other hand, if the shearing mechanism were caused to rotate slower, to cut sheets of greater length than said circumference, the knives would travel slower than said board at the instant of the shearing operation and would tend to retard and crush it. Therefore, I include in the train of gearing to drive the shearing mechanism, the elliptical gears above described, which are circumferentially adjustable and may be secured in variable angular position on their respective shafts, so that, in accordance with such variations in the rate of rotation of said knives as are required to shear sheets of different lengths, said gears may be so set that the speed of the knives at the instant of each shearing operation shall be equal to the speed of traverse of said board, so as to cleanly cut the latter. In other words, it being characteristic of the machine above described that the webs are fed therethrough at a constant rate, by means of the frictional engagement of the metallic belts 18 and 19 between the feed rolls 23 and 24, the length of the sheets cut from the cellular board 80 is varied by varying the rate of rotation of the knives 60 and 61, and, to insure that the paper shall be sheared without tearing or crushing it, said knives are caused to move at the same speed as said webs while in engagement therewith, regardless of the time required for them to make a complete revolution, such momentary speed of the knives being determined by the adjusted angular position of the elliptical gears.

With respect to the machine just described, it will be apparent, first, that in the use of a series of comparatively narrow belts, to provide the conveying means, I expose a relatively large area of the outside faces of the combined webs and thus facilitate the drying operation, which, obviously, is merely the process of evaporation; second, that even if other advancing means than these belts are employed, I have practically eliminated friction in drawing the webs between the heating plates. Furthermore, it will be noted that the means for advancing the paper webs, instead of being at one end of the machine, are located between the heating plates, whereby the machine is of comparatively short length and occupies less space than machines in which the heating and advancing means are separated. It may be said, therefore, that a machine embodying my complete invention possesses the manifold advantages of, first, occupying comparatively but little space; second, reducing friction and therefore economizing power and insuring against the necessity for the application of crushing or destructive forces to advance the paper; and, third, providing advancing means which does not cover the entire outer surfaces of the webs, but exposes the major portion of the area of said surfaces to facilitate the drying operation. Furthermore, I prefer to employ endless conveyer belts of flexible sheet metal, primarily because the weight of belts of this character, throughout the extent of the runs, not only serves to keep the webs in contact with each other during the drying operation, but also provides sufficient gripping friction to engage and advance said webs. In this manner, the upper heating plate, instead of being held in contact with the upper facing web, may be raised slightly above the same to provide an air space to facilitate evaporation. In addition to this, belts of leather, fabric or the like materials, are subject to changes under different conditions of humidity and temperature, while a sheet-metal belt, while sufficiently flexible, does not expand and contract under such conditions to an extent sufficient to impair the proper performance of its functions.

I do not desire to limit myself to the precise details of construction and arrangement above described, as it is obvious that various modifications may be made therein without departing from the essential features of my invention as defined in the appended claims.

I claim as new and desire to secure by Letters Patent:

1. In a machine for facing corrugated paper, the combination, with members forming opposed and substantially continuous heating and pressing surfaces, of endless conveying means passing between said surfaces and adapted to advance the superposed paper webs therethrough, the total operative area of said conveying means covering a minor portion only of the area of the outer faces of said webs and the major portion of the latter being in direct contact with said heating and pressing surfaces.

2. In a machine for facing corrugated paper, the combination, with members forming opposed and substantially continuous heating and pressing surfaces, of a plurality of endless conveyer belts spaced at a distance from each other and directed between said surfaces to advance the superposed paper webs therethrough, the total area of said belts covering a minor portion only of the area of the outer faces of said webs and the major portion of the latter being in direct contact with said heating and pressing surfaces.

3. In a machine for facing corrugated paper, the combination, with members providing opposed and substantially continuous heating and pressing surfaces, and means for adjustably varying the distance between said opposed members, of a series of pairs of opposed endless belts spaced at a distance from each other and running between said members to guide and advance the paper webs therethrough with a substantial portion of the area thereof in direct contact with said heating and pressing surfaces.

4. In a machine for facing corrugated paper, the combination, with means for continuously subjecting the superposed paper webs in transit to opposed stationary heating and pressing members, of advancing means operating between said webs and said heating and pressing means, the total operative area of said advancing means covering a minor portion only of the surfaces of said webs whereby a substantial portion thereof is continuously in direct contact with said heating and pressing members.

5. In a machine for facing corrugated paper, the combination, with a series of pairs of endless belts, said pairs being spaced at a distance from each other and having opposed runs, of means arranged to direct between said belts a corrugated paper web with and between plane facing webs, means for driving said belts in unison, and means for applying heat and substantially continuous pressure to said webs during transit through the machine, substantial portions of the areas of said webs being in direct contact with said heating and pressing means.

6. In a machine for facing corrugated paper, the combination, with a series of pairs of endless belts, said pairs being spaced at a distance from each other and having opposed runs, of means arranged to direct between said belts and runs a corrugated paper web with and between plane facing webs, means for driving said belts in unison, feed rollers between which said belt-runs pass, means for adjustably varying the space between said rollers and thereby correspondingly varying the space between said runs, and means for applying heat and substantially continuous pressure to the superposed webs during transit through the machine, substantial portions of the areas of said webs being in direct contact with said heating and pressing means.

7. In a machine for facing corrugated paper, the combination, with movable endless belts of flexible sheet metal having opposed runs, of means arranged to direct between said opposed belt-runs a corrugated paper web with and between plane facing webs, drums supporting said belts arranged to drive them in unison, feed rolls between which said belt-runs pass, having means arranged to adjustably vary the space between said runs, whereby said webs are carried by and moved in unison with said belts, and means arranged to heat said belt-runs independently of the other portions of the belts.

8. In a machine for facing corrugated paper, the combination, with a series of pairs of movable endless belts of flexible sheet metal spaced at a distance from each other and having opposed runs, of means arranged to direct between said opposed belt-runs a corrugated paper web with and between plane facing webs, drums supporting said belts arranged to drive them in unison, feed rolls between which said belt-runs pass, having means arranged to adjustably vary the space between said runs, whereby said webs are carried by and moved in unison with said belts, and means arranged to heat said belt-runs independently of the other portions of the belts, said means comprising stationary plane-faced steam boxes between which said belt-runs extend.

9. In a machine for facing corrugated paper, the combination, with a series of pairs of movable endless belts of flexible sheet metal having opposed runs, of means arranged to direct between said opposed belt-runs a corrugated paper web with and between plane facing webs, drums supporting said belts arranged to drive them in unison, feed rolls between which said belt-runs pass, having means arranged to adjustably vary the space between said runs, whereby said webs are carried by and moved in unison with said belts, and means arranged to heat said belt-runs independently of the other portions of the belts, comprising steam receptacles above and below said belt-runs having telescopic connection with pipes leading to the steam supply.

10. In a machine for facing corrugated paper, the combination, with a series of pairs of movable endless belts of flexible sheet metal spaced at a distance from each other and having opposed runs, of means arranged to direct between said opposed belt-runs a corrugated paper web with and between plane facing webs, drums supporting said belts arranged to drive them in unison, feed rolls between which said belt-runs pass, having means arranged to adjustably vary the space between said runs, whereby said webs are carried by and moved in unison with said belts, means adjustable to vary the tension on said belts in correspondence with the adjustment of said feed rolls, and means arranged to heat said belt-runs independently of the other portions of the belts.

11. In a machine for facing corrugated paper, the combination, with a series of pairs of movable endless belts of flexible sheet metal spaced at a distance from each other and having opposed runs, of means arranged to direct between said opposed belt-runs a corrugated paper web with and between plane facing webs, drums supporting said belts arranged to drive them in unison, feed rolls between which said belt-runs pass, having means arranged to adjustably vary the space between said runs, whereby said webs are carried by and moved in unison with said belts, means adjustable to vary the tension on said belts in correspondence with the adjustment of said feed rolls, said means comprising independently adjustable rollers for the respective belts, and means arranged to heat said belt-runs independently of the other portions of the belts.

12. In a machine for facing corrugated paper, the combination, with means for advancing a corrugated paper web with facing webs upon opposite sides thereof between opposed heaters, of shearing mechanism for said webs comprising opposed and intergeared rotary knives, and a train of gears for rotating said knives, said train including elliptical gears for varying the speed of rotation of said knives, and said gearing insuring operation of said shearing mechanism in definite relation to said advancing means.

13. In a machine for facing corrugated paper, the combination, with means for progressing a corrugated paper web with plane facing webs upon opposite sides thereof, and opposed heaters between which said webs are directed under substantially continuous pressure of shearing mechanism for said webs comprising intergeared opposed rotary knives, and means rotating said knives, said means being variable to change the speed of rotation of said knives and comprising connections to operate said shearing mechanism in definite relation to said progressing means.

14. In a machine for facing corrugated paper, the combination, with means for progressing a corrugated paper web with plane facing webs upon opposite sides thereof, said means including opposed endless belts between which said webs are directed, and opposed heaters upon opposite sides of said webs, of shearing mechanism for said webs comprising opposed and intergeared rotary knives, and a train of gears for rotating said knives, said train including elliptical gears for varying the speed of rotation of said knives, and said gearing insuring operation of said shearing mechanism in definite relation to said progressing means.

15. In a machine for facing corrugated paper, the combination, with means for progressing a corrugated paper web with and between plane facing webs, said means including opposed endless belts of sheet metal respectively in contact with said facing webs, opposed heaters between which said webs are directed, and means for varying the space between said heaters, of shearing mechanism for said web, said mechanism comprising opposed and intergeared rotary knives, said knives being driven by gearing which includes elliptical gears and which is variable to change the speed of rotation of said knives, and said gearing insuring operation of said shearing mechanism in definite relation to said progressing means.

16. In a machine for facing corrugated paper, the combination, with means for progressing a corrugated paper web with and between plane facing webs, said means including opposed endless belts of sheet metal respectively in contact with said facing webs, opposed heaters comprising plane-faced steam boxes, means for adjustably supporting said heaters upon respectively opposite sides of said webs, means for connecting said heaters with a source of steam supply, the connecting means for one of said heaters comprising a telescopic pipe connection whereby said heater may be raised and lowered.

17. In a machine for facing corrugated paper, the combination, with means for progressing a corrugated paper web with and between plane facing webs, said means including opposed endless belts of sheet metal respectively in contact with said facing webs, opposed heaters comprising plane-faced steam boxes, means for adjustably supporting said heaters upon respectively opposite sides of said webs, means for connecting said heaters with a source of steam supply, the connecting means for one of said heaters comprising a telescopic pipe connection whereby said heater may be raised and lowered, of shearing mechanism for said webs comprising intergeared opposed rotary knives, said knives being driven by gearing which includes elliptical gears and which is variable to change the speed of rotation of said knives, and said gearing insuring operation of said shearing mechanism in definite relation to said progressing means.

In testimony of the foregoing, I have hereunto set my hand in the presence of two witnesses.

GEORGE W. SWIFT, Jr.

Witnesses:

Grace Heisler Oells,

Wm. H. Heisler.